United States Patent [19]

Golightly

[11] Patent Number: 4,947,027
[45] Date of Patent: Aug. 7, 1990

[54] SYSTEM FOR IDENTIFYING AUTHORIZED USE OF CREDIT CARDS

[76] Inventor: Cecelia K. Golightly, 1382 Cherry Hill Rd., Mendota Heights, Minn. 55118

[21] Appl. No.: 151,427

[22] Filed: Feb. 2, 1988

[51] Int. Cl.$^5$ .............................................. G06L 7/04
[52] U.S. Cl. .................................... 235/448; 235/380; 235/487; 235/495; 902/5
[58] Field of Search ............... 235/380, 487, 448, 495; 902/5

[56] References Cited

U.S. PATENT DOCUMENTS

| | | | |
|---|---|---|---|
| 3,184,714 | 5/1965 | Brown et al. | 235/448 X |
| 3,399,473 | 9/1968 | Jaffe | 40/2.2 |
| 3,624,938 | 12/1971 | Richard | 40/2.2 |
| 3,713,235 | 1/1973 | Roberts | 40/2.2 |
| 3,972,138 | 8/1976 | Armbruster et al. | 40/2.2 |
| 4,100,689 | 7/1978 | Broune | 40/2.2 |
| 4,105,156 | 8/1978 | Dethloff | 235/441 |
| 4,187,498 | 2/1980 | Creekmore | 340/149 |
| 4,386,266 | 5/1983 | Chesarek | 902/5 X |
| 4,562,342 | 12/1985 | Solo | 235/490 X |
| 4,593,936 | 6/1986 | Opel | 283/112 |
| 4,626,669 | 12/1986 | Davis et al. | 235/380 |
| 4,643,453 | 2/1987 | Shapiro et al. | 283/73 |

OTHER PUBLICATIONS

Article entitled "Bank Cards, France Plays a Trump", taken from an advertising supplement appearing in Fortune International Magazine, vol. 117, No. 2, published Jan. 18, 1988.

*Primary Examiner*—David L. Trafton
*Attorney, Agent, or Firm*—Kinney & Lange

[57] ABSTRACT

A credit card system for providing verification of authority of a credit card bearer to use the credit card for a credit transaction. Initial authorization of card use is given to the authorized user upon selection by the user of one of a set of supplemental characters appearing on the card as the authorized user's private identifier. Presentation of the card at a point of sale initiates a check of this private identifier against a supplemental character identified by the presenter of the card as his/her private identifier.

10 Claims, 3 Drawing Sheets

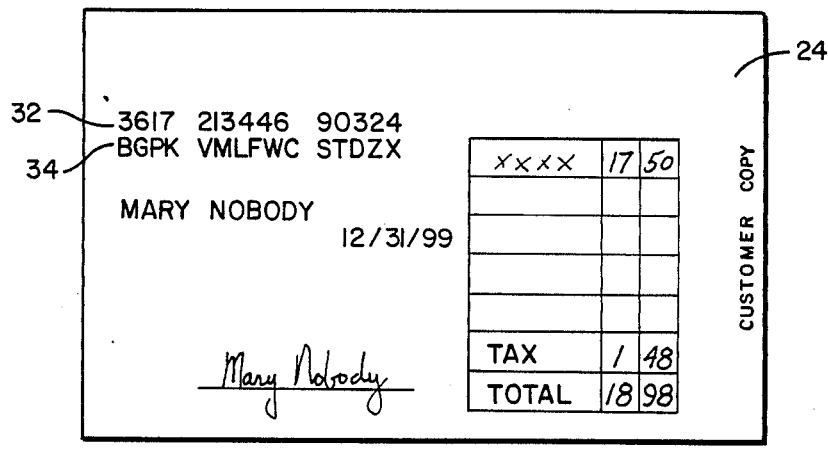
FIG. 3
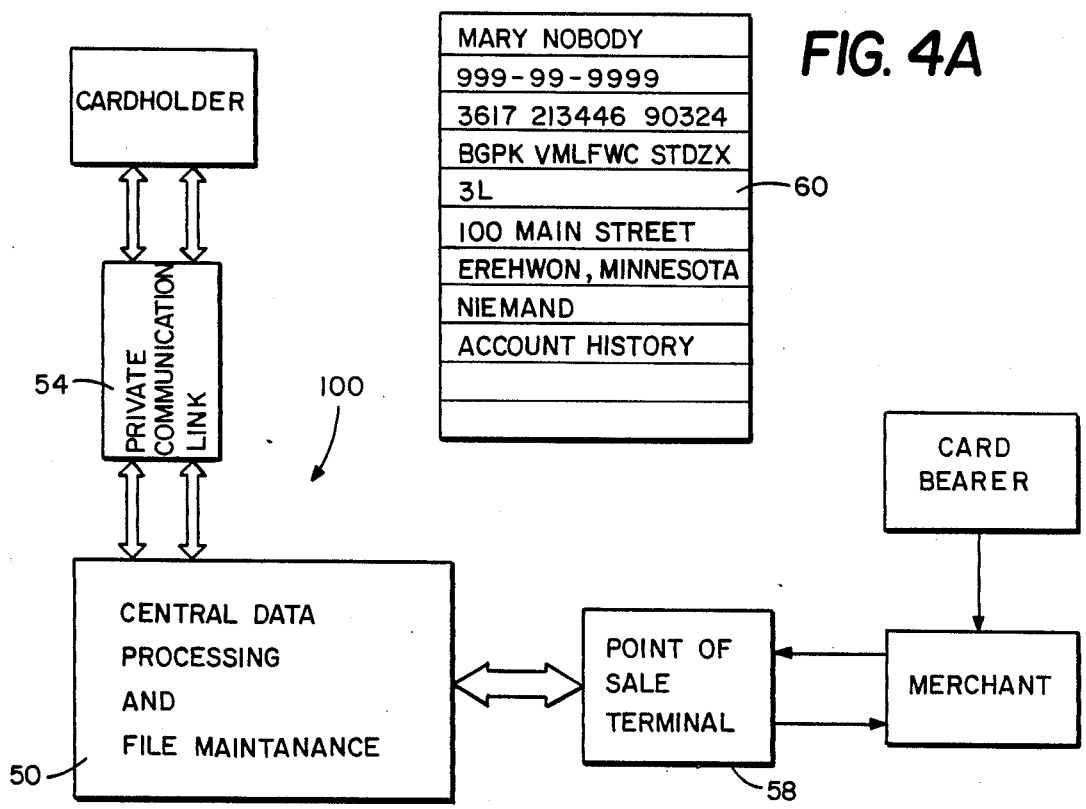
FIG. 4A
FIG. 4

SYSTEM FOR IDENTIFYING AUTHORIZED USE OF CREDIT CARDS

BACKGROUND OF THE INVENTION

1. Field of the Invention

The present invention relates to a system for identifying a presenter of a credit card for a credit transaction as an authorized user of the credit card.

2. Description of the Prior Art

Credit cards have proved fertile ground for fraud and theft. The interest of the financial industry in maintaining a credit card system which is both streamlined and easy to use is threatened by the overriding interest of maintaining security. The ease with which thieves obtain all information necessary for fraudulent use of a credit card directly from the face of the credit card or from discarded invoices, portions of the credit slip, or carbon papers torn from credit slips has repeatedly compromised security.

A number of examples of attempted solutions to the problem of credit card fraud appear in the prior art. For example, U.S. Pat. No. 4,643,453 issued to Shapiro et al. and entitled CREDIT CARD SECURITY SYSTEMS proposes the use of auxiliary character markings corresponding to months of the year for which the card is valid. The bank upon receipt of the bank copy of the invoice will accept the invoice for payment only if it contains proper auxiliary markings for the date of use of the card.

U.S. Pat. No. 4,626,669 entitled INTERCEPT SYSTEM FOR INTERCEPTING STOLEN, LOST AND FRAUDULENT CARDS requires the card to have a permanently recorded electromagnetically readable tape laminated onto the card body. The visibly readable portions of the card must match numbers derived from machine readable codes recorded on the magnetic tape. The magnetic tape may also include a code to generate an identification number which must be memorized by the cardholder and which does not appear on the face of the card.

Similarly, U.S. Pat. No. 4,105,156 issued to Dethloff and entitled IDENTIFICATION SYSTEM SAFEGUARDED AGAINST MISUSE teaches the inclusion of an integrated circuit on an identification card for storing a secret number, which a user must remember to verify that he is the authorized user of the card.

Other patents, particularly U.S. Pat. No. 3,972,138 issued to Armbruster et al. entitled CREDIT CARD; U.S. Pat. No. 3,713,235 issued to Roberts et al. entitled COMBINATION CREDIT CARD; U.S. Pat. No. 3,624,938 issued to Richard entitled FOOLPROOF CREDIT CARD; and U.S. Pat. No. 3,399,473 issued to Jaffe entitled COMBINATION CREDIT CARD disclose a variety of mechanical adaptions of credit cards whereby a user may indicate his personal secret code or authorization.

Additionally, simplification for use and improved reliability of remote terminals for central data processing systems have provided a backdrop for verification of authority to cash checks as taught in such disclosures as U.S. Pat. No. 4,187,498 issued to Creekmore.

However, employment of such improved communications to provide an authorized user of a credit card with both quick verification of his/her authority has not been provided. Such a system would additionally allow the authorized user to quickly change indicia of his/her authority. A key to such an improvement is provided by allowing the cardholder a secret identifier as his/her authority and by providing for his/her changing that symbol to maintain its secrecy.

SUMMARY OF THE INVENTION

The present invention employs no conceptual elements which are not already a part of the credit card system. Accordingly, the security system of the present invention employs credit cards, but modified in accordance with the invention, conventional credit card purchase invoices or charge slips and a modified account data file for each issued credit card.

The modified credit card of the present invention is issued to a potentially authorized user. However, before use of the card, the potential user must provide the credit card issuer with a letter or character for inclusion in his account data file. The selected letter or character will remain in the file and must be provided by the user upon presentation of the card for use in a credit transaction.

The authorized user of the card will select the letter or character from a set of supplemental characters which are embossed into the card. One character will be provided corresponding to each digit of the account number appearing on the card. The supplemental characters will be disposed on the cards in such a way as to indicate each character's corresponding digit in the account number.

When the credit card is presented to a merchant for use in a purchase, the merchant will request that the presenter identify a character from the supplemental set to confirm the presenter's authority to use the card. One way of doing this will be for the merchant to process the card invoice using the credit card to imprint both the account number and the supplemental set of characters onto the invoice. The cardholder will then circle or indicate his/her selected letter or character on his/her receipt copy of the invoice set. The merchant then may relay the account number and the selected code character to the card issuer. The card issuer will check to see that the information provided corresponds to the information in its official record. Where it does, the card issuer may authorize use of the card for the transaction.

A cardholder may change the selected code at any time by calling the card issuer and identifying selected information in his account file such as his/her name, address and social security number which are retained in the account data file.

BRIEF DESCRIPTION OF THE DRAWINGS

FIG. 3 is a plan view of the customer copy of the credit slip of FIG. 2 marked by a presenter of a credit card to verify his/her authority to use the card;

FIGS. 4 and 4A schematically depict information flows between elements of the present invention and indicate information retained in data files with respect to each account file in the system;

DETAILED DESCRIPTION OF THE PREFERRED EMBODIMENT

Figure 1:
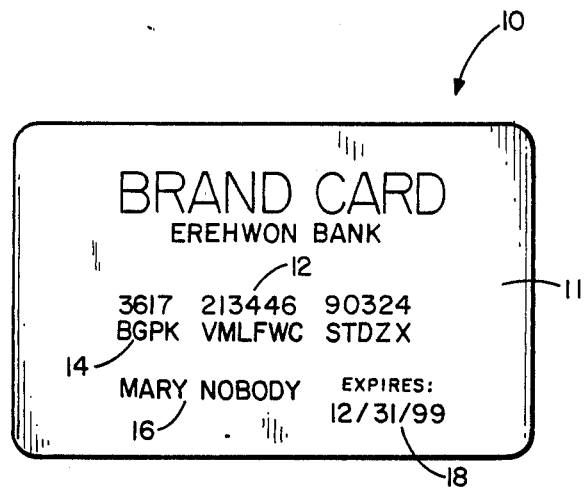
FIG. 1 is a plan view of a credit card modified in accordance with one embodiment of the present invention.

FIG. 1 illustrates a credit card 10 which has a front face 11. A first set of numeric characters 12 is embossed on the front face 11 indicating an account number. Embossed as raised characters in one to one correspondence with the characters of the account number 12 is a second set of supplemental characters 14. Second set of supplemental characters 14 typically comprise the letters of the alphabet without the letters I or 0. Each character of the supplemental set 14 is otherwise randomly selected from the English alphabet. A third set of embosed raised characters 16 indicates the cardholder's name, and a fourth set of embossed characters 18 indicates the expiration date of the credit card.

Figure 2A:
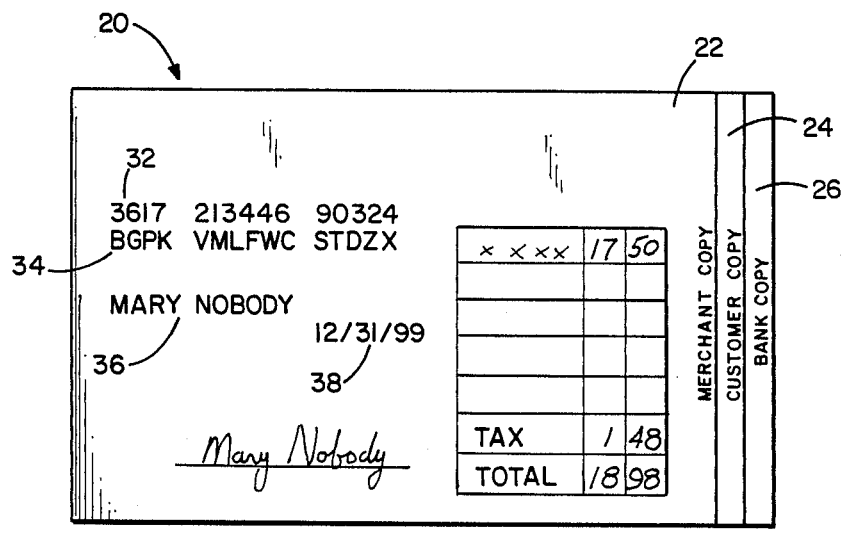
FIGS. 2A and 2B are views of conventional credit slips used in the system of the present invention.

FIG. 2A illustrates a conventional credit slip or invoice 20, comprising a merchant copy 22, a customer copy 24, and a bank copy 26. Credit slip 20 has been processed by a clerk of a merchant. Accordingly, an impression 32 of account number 12, an impression 34 of supplemental character set 34; an impression 36 of name set 16; and an impression 38 of the expiration date 18 appear on the merchant copy, customer copy and bank copy of credit slip 20. Credit slip 20 has been marked by the clerk to indicate an item purchased and a total amount.

Figure 2B:
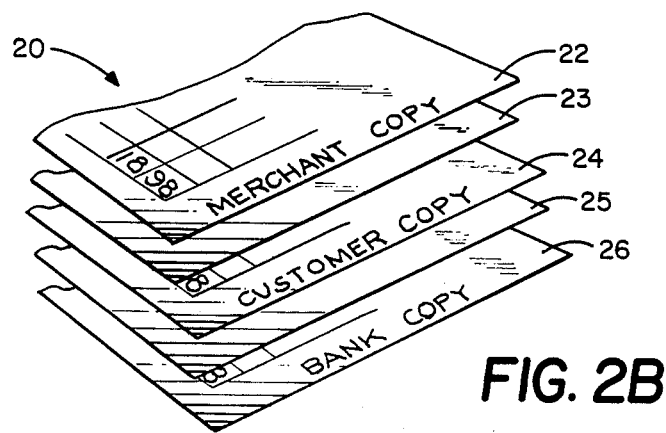

FIG. 2B illustrates an exploded view of credit slip 20 showing that credit slip 20 is a layered set of sheets including merchant copy 22, customer copy 24 and bank copy 26, which are interleaved with carbon papers 23 and 25.

FIG. 3 illustrates customer copy 24 of credit slip 20 which has been marked by its presenter to indicate a characater in supplemental set 34. A clerk processing the transaction may then relay to the card issuer the code 3L, that is, the supplemental character indicated by the card presenter and its corresponding digit in account number 32.

Figure 5:
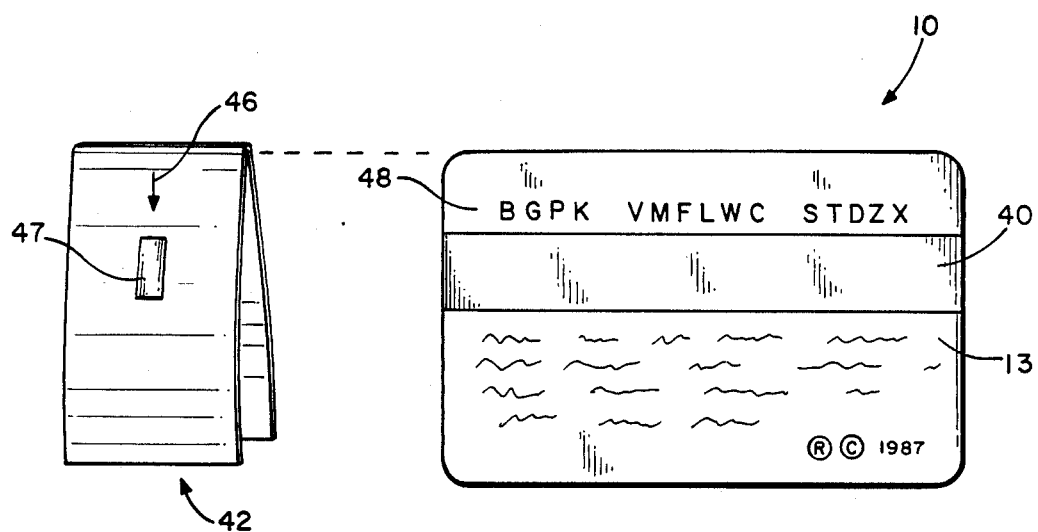
FIG. 5 is a plan view of a back of a credit card showing a magnetic strip and a slip arrangement provided in the system of the present invention to modify read-out characteristics of the magnetic slip to indicate the presenter's indication of his/her secret code.

FIG. 5 illustrates a modification of the system where electronic terminals are used to read and automatically relay information to the card issuer central data processing unit. Credit card 10 comprises a back face 13 on which a magnetic tape 40 is fixed. Magnetic tape 40 includes a code representing the account number as well as other information. A slip 42 is provided which fits snugly around card 10 and on which is disposed a magnetically non-conductive region 44 which blocks reading a portion of magnetic strip 40. Slip 42 may be disposed on card 10 such that region 44 blocks a portion of magnetic tape 40 corresponding to the digit of the account number corresponding with the character from the supplemental code. This is done by aligning arrow 46 with the selected character from supplemental character set 48, or if arrow 46 is disposed on the opposite leaf of slip 42, by aligning arrow 46 with the selected characters from set 14. Upon reading the code, the central data processing unit may resolve the authorized user's selected code letter.

FIG. 4 illustrates the information flows of the system of the present invention. System 100 comprises a central data processing and file maintenance unit 50, a plurality of merchant terminals 58, and a private communcations link 54 between the central processing unit 50 and an authorized card user. Private communication link 54 may be a telephone link between an authorized user and the central data processing unit 50, or an employee of the card issuer with access to the central processing unit 50. Alternatively, private communication link 54 may be the mails, private messenger service or personal appearance by a user or potential authorized user at the offices of card issuer.

Terminals 58 are present in all merchant establishments which accept credit cards from the card issuer for credit transactions. A terminal 58 may be a telephone link between a clerk of the merchant and an employee of the card issuer, the merchant identifying itself by a merchant code number. Alternatively, terminal 58 may be a data reception and transmission terminal adapted to read information from the cardholder's card and to accept input of the secret identification code. Such a terminal 58 also will be in communication directly with the central data processing unit 50 by a telephone link.

FIG. 4A illustrates information maintained in an account data file in the central data processing unit 50. Such a file 60 will include the authorized card user's name, his/her social security number, an account number corresponding to the account number appearing on the credit card, a secret ID code corresponding with the supplemental character selected by the card user and its corresponding digit from the account number, the supplemental character set appearing on the card, the cardholder's address and an account history.

Operation of the system will now be discussed with reference to all of the figures herein. An initial application for issuance of a credit card 10 is made by a potential authorized user over private communications link 54. At such time the card issuer will request initializing identification data for an account data file 60. Such information may include, for example, the potential user's name, his/her social security number and his/her address, as well as other more obscure information (such as mother's maiden name) which can be used to verify the user's identity. After receipt of such data, the card issuer will issue a credit card 10 to the potential user over private communication link 54. At such time an account number 12 is supplied along with a set of supplemental characters 14. Before the card issuer authorizes the use of credit card 10, it will request and receive over private communication lines 54 the card user's selection of a character from supplemental character set 14. This information will be retained in account data file 60 for later use in verifying a card presenter's authority to use credit card 10. Alternatively, a supplemental character may be assigned to the user upon issuance of the card and authority to use the card granted upon issuance.

Presentation of credit card 10 at a merchant is only slightly different than prior modes of presentation. The bearer of credit card 10 presents credit card 10 to a merchant in conjunction with the purchase of goods or services The merchant will process a conventional credit slip or invoice 20 by impressing representations of the embossed portions of credit card 10 onto credit slip 20 and entering a dollar and cents amount of the purchase in the appropriate spaces provided on credit slip 20. The merchant may then present customer copy 24 of credit slip 20 to the card bearer whereupon the card bearer will indicate on customer copy 24 a character selected from supplemental character set 14 imprinted onto customer copy 24. Written notation of the supplemental character prevents a non-authorized party from overhearing the selected character. The merchant will then transmit over terminal 58 the account number and the selected character to central processing 50 for verification. Central data processing will examine data file 60 for the appropriate account to determine whether the supplemental character transmitted from terminal 58 matches the character stored in account file 60. Only if they match will central data processing approve the transaction.

Alternative modes of supplying the clerk a selected character may be used depending on the environment or the desirability of not marking even customer copy 24.

As indicated above, if terminal 58 is provided with means for electromagnetically reading the magnetic strip on credit card 10, communication of the selected character may be done without marking of customer slip 24.

Private communications link 54 may be used by an authorized user to change his/her selected supplmental character. An authorized user initiates communication with central data processing over private communication link 54 and indicates his/her desire to change his/her selected code. Central data processing 50 then requests the user identify data in account data file such as his/her name, social security number, and address. Upon successful identification of such private personal information, central data processing allows the authorized user to change his/her selected code and will store the current selected code in account data file 60. Accordingly, an authorized user may change his/her selected code, for example, after every use of credit card 10.

The present invention provides for a streamlined, quick and yet highly private method for verifying authority of a card presenter for use of that card. Private communication links also offer a convenient means for the diligent card user to protect himself/herself and the secrecy of his/her personal code from the use of unauthorized individuals.

Although the present invention has been described with reference to preferred embodiments, workers skilled in the art will recognize that changes may be made in form and detail without departing from the spirit and scope of the invention.

WHAT IS CLAIMED IS:

1. A system for indicating a bearer of a credit card as its authorized cardholder, the system comprising:
   a plurality of credit cards issued to cardholders, each credit card being embossed with a first set of raised characters indicating an account number and a supplemental set of raised characters which have a one to one correspondence with each digit of the account number;
   an account data file for each account number comprising identification data with respect to a cardholder, the identification data being also known or determinable by the cardholder, the account number, a cardholder identification code comprising the account number, a character selected by the cardholder from the set of supplemental characters and the digit in the account number corresponding to the selected characater; and
   means for matching the account number appearing on a presented credit card with its respective account data file and for comparing a supplemental character identified from the presented credit card by the bearer with the selected supplemental character appearing in the cardholder identification code;
   whereby a match indicates the bearer as being the cardholder and lack of a match indicates the bearer is not the cardholder.

2. The system as defined in claim 1, wherein the matching and comparing means further comprises:
   data processing means for maintaining the plurality of account data files, for calling account data files in response to input of cardholder account numbers, for determining matches between a supplemental character identified by the presenter with the selected supplemental character, and for generating approval or disapproval indications as a result thereof;
   a data terminal at the point of presentation of a credit card for relaying credit card generated data and presenter generated data to the data processing means and for displaying approval or disapproval inications; and
   a communications link between the data terminal and the data processing means.

3. The system as defined in claim 2, wherein each credit card comprises:
   raised characters indicating a name of the cardholder;
   raised characters indicating the expiration date of the card; and
   a machine-readable representation of the cardholder account number 4. The system as defined in claim 3, wherein the data terminal further comprises means for reading and transmitting the machine-readable representation of the cardholder account number.

5. The system as defined in claim 4, further comprising sleeve means adapted to be fitted over the credit card to alter the machine readout of its respective account number to indicate the digit corresponding to a supplemental character identified by the presenter.

6. The system as defined in claim 2, the system further comprising:
   means for changing the selected supplemental character in the account data file at the behest of the cardholder upon identification by the cardholder of selected data in the account data file.

7. The system as defined in claim 1, wherein the set of supplemental characters is selected at random from a set of characters.

8. The system as defined in claim 1, further comprising:
   a charge slip having a plurality of sheets which can be marked by the raised characters of a credit card, any one of which sheets can be separately marked upon by the credit card bearer to identify a supplemental character.

9. A method of verifying a bearer of a credit card as its authorized user, the method comprising the steps of:
   issuing a credit card to an authorized user, embossed with a first set of raised characters indicating an account number and a second set of raised supplemental characters, each of the supplemental characters being in one to one correspondence with a particular digit of the account number;
   requiring the authorized user to select at least a first supplemental character from the second set of raised characters before allowing the credit card to be used for credit transactions;
   retaining in an account data file for each issued credit card, identification data with respect to the authorized user, the account number and a user identification number formed from the account number, the selected supplemental character and the corresponding digit to the selected supplemental character from the account number;

employing the credit card to print the account number and the supplemental characters or a charge slip including at least a customer copy of the charge slip;

matching the account number appearing upon the credit card with its respective account number file upon presentation of the credit card for use;

having the bearer of the presented card mark a supplemental character on the customer copy of the charge slip;

comparing the marked supplemental character to the selected supplemental character in the account data file; and approving the transaction if and only if the indicated supplemental character matches the identified supplemental character.

10. A credit card system, which comprises:

a credit card with a pair of primarily flat faces;

a first set of raised characters on a first face of the credit card indicating an account identification code;

a machine-readable representation of the characters of the account identification code;

a supplemental set of raised characters on the credit card, each character of the supplemental set having a correspondence to a different first set character; and a sleeve fitted over the credit card to alter the machine-readable representation of the cardholder account code upon alignment of the sleeve with a character from supplemental set character identified by a bearer of the credit card.

* * * * *